(12) United States Patent  (10) Patent No.: US 7,274,816 B2
Yoshida  (45) Date of Patent: *Sep. 25, 2007

(54) METHOD AND APPARATUS OF GENERATING THREE DIMENSIONAL IMAGE DATA HAVING ONE FILE STRUCTURE AND RECORDING THE IMAGE DATA ON A RECORDING MEDIUM, AND RECORDING MEDIUM FOR STORING THE THREE DIMENSIONAL IMAGE DATA HAVING ONE FILE STRUCTURE

(75) Inventor: Hideaki Yoshida, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/189,601

(22) Filed: Jul. 25, 2005

(65) Prior Publication Data
US 2005/0259339 A1 Nov. 24, 2005

Related U.S. Application Data

(62) Division of application No. 09/941,232, filed on Aug. 27, 2001, now Pat. No. 6,944,328.

(30) Foreign Application Priority Data
Aug. 29, 2000 (JP) ............................... 2000-259490

(51) Int. Cl.
G06K 9/00 (2006.01)
(52) U.S. Cl. ........................ 382/154; 356/12; 359/462; 396/324

(58) Field of Classification Search ................. 382/154, 382/282, 285; 345/419–427; 356/12–14; 359/462–477; 396/324, 326, 327; 386/111; 600/166, 109; 348/42; 352/57
See application file for complete search history.

(56) References Cited

U.S. PATENT DOCUMENTS

| 5,671,450 | A | 9/1997 | Suzuki |
| 6,222,583 | B1 | 4/2001 | Matsumura et al. |
| 6,295,067 | B1 * | 9/2001 | Dubnow ..................... 345/419 |
| 6,496,183 | B1 | 12/2002 | Bar-Nahum |
| 6,574,423 | B1 | 6/2003 | Oshima et al. |
| 6,621,921 | B1 | 9/2003 | Matsugu et al. |
| 6,944,328 | B2 * | 9/2005 | Yoshida ....................... 382/154 |

FOREIGN PATENT DOCUMENTS

JP 59-30390 A 2/1984

(Continued)

Primary Examiner—Sheela Chawan
(74) Attorney, Agent, or Firm—Frishauf, Holtz, Goodman & Chick, P.C.

(57) ABSTRACT

A data structure of a stereo image file recorded on a recording medium which is readable by a computer to be applied to an image processing apparatus includes first monocular image data; second monocular image data having parallax with respect to the first monocular image data; and stereo data containing information regarding the data structure of the stereo image file, the stereo data including (i) information indicating whether or not the image file is a stereo image file, and (ii) information regarding arrangement of monocular image data items included in the image file.

32 Claims, 3 Drawing Sheets

FOREIGN PATENT DOCUMENTS

| | | |
|---|---|---|
| JP | 05-030538 | 2/1993 |
| JP | 7-170534 A | 7/1995 |
| JP | 9-224264 A | 8/1997 |
| JP | 9-327042 | 12/1997 |
| JP | 11-088912 | 3/1999 |
| JP | 11-191895 A | 7/1999 |
| JP | 2001-296499 | 10/2001 |

\* cited by examiner

METHOD AND APPARATUS OF GENERATING THREE DIMENSIONAL IMAGE DATA HAVING ONE FILE STRUCTURE AND RECORDING THE IMAGE DATA ON A RECORDING MEDIUM, AND RECORDING MEDIUM FOR STORING THE THREE DIMENSIONAL IMAGE DATA HAVING ONE FILE STRUCTURE

CROSS-REFERENCE TO RELATED APPLICATIONS

The present application is a Division of U.S. patent application Ser. No. 09/941,232 filed Aug. 27, 2001 now U.S. Pat. No. 6,944,328, which is based upon and claims the benefit of priority from the prior Japanese Patent Application(s) No. 2000-259490, filed Aug. 29, 2000, the entire contents of each of which are incorporated herein by reference.

BACKGROUND OF THE INVENTION

1. Field of the Invention

The present invention relates to a method and apparatus for generating a three-dimensional image or stereograph having one file structure, and recording the image on a recording medium, and a recording medium that stores the three-dimensional image data and, more particularly, to a method of generating a three-dimensional image or stereograph having one file structure, which allows to store data of a three-dimensional image or stereograph in one file, and allows processing of stereo image data for respective files, and recording the image on a recording medium, an apparatus for recording the three-dimensional image data and recording the image data on a recording medium, and a recording medium that stores the three-dimensional image data.

2. Description of the Related Art

Various proposals have been made about a method of recording photographic information containing three-dimensional information by taking photos of an object, and observing a three-dimensional image by reproducing the photographic information. Of such proposals, a so-called binocular type stereographic system which records two images having parallax corresponding to that between the viewpoints of the right and left eyes of a person, and allows the user to observe the two images by the right and left eyes is known. Since the binocular type stereographic system uses a photographing apparatus with a simple structure, it can provide a low-cost photographing apparatus and reproduction apparatus, and allows effective observation of a three-dimensional image. Hence, the binocular type stereographic system has been utilized to date for so long.

In this binocular type stereographic system, various display systems are available. For example, when many people simultaneously observe a large screen, a polarizing projection system that uses polarizing glasses, and a time division display system that uses shutter glasses are used. Since these systems are bulky and expensive, they are rarely used except for special business purposes. For so-called personal use, a stereoscopic view system that allows stereoscopic view of a stereo image pair as the most basic and classic method is known, although the number of persons who can observe at the same time is limited to one. Today, this system is still prevalently used as a very low-cost system that can observe a clear image.

The stereo image pair will be explained in detail below. Two images, i.e., an L image corresponding to an image observed when an object is viewed from the left eye viewpoint, and an R image corresponding to an image observed when the object is observed from the right eye viewpoint are normally juxtaposed with a small gap, and when a person simultaneously observes these images, he or she can recognize them as a single three-dimensional image.

As a simplest photographing apparatus of such images, a system that combines 35-mm single-lens reflex camera with a stereo adapter has prevailed. In this system, two, R and L images are stored in practice in a single standard image frame having an aspect ratio of 3:2. Therefore, each of the R and L images, i.e., two images containing three-dimensional information to be observed normally has a frame having an aspect ratio of about 3:4.

In this specification, two, R and L images which are juxtaposed spatially, i.e., on an image plane, and contain single three-dimensional image will be referred to as a stereo image pair. Note that the aforementioned practical configuration (numerical values of aspect ratios and the like) is merely an example. But for the sake of simplicity, the following explanation will be given under the condition that the above practical values are taken as an example unless otherwise specified.

This stereo image pair has very practical features:

(1) These images can be recorded, printed, transferred, and so forth without requiring any special system.

(2) These images can be directly stereoscopically observed as long as an appropriate condition is satisfied. That is, no special apparatus is required upon observing a three-dimensional image by matching right and left images.

Especially, in feature (2), "match of right and left images" is defined as a state wherein R and L images are normally captured by the right and left eyes, and are recognized not as two different images but as a single three-dimensional image. In image match, the right and left images can be matched using a so-called "parallel view method" in which the lines of sight are parallel to each other upon observation, as long as images are printed with an appropriate size (more specifically, the width is slightly smaller than a value twice the eye width: 10 to 13 cm) and have a "parallel layout" (the L image is set on the left side, and the R image on the right side). The "parallel view method" is a method for observing a three-dimensional image by directly observing R and L images while maintaining the lines of sight nearly parallel to each other like in a case wherein a person looks at an image which is far away, without the aid of any devices, although some practices are required in some individuals. Also, in image match, a "cross layout" in which the right and images are juxtaposed, but their positions are replaced unlike in the "parallel view method" is available. In this "cross layout", there is no limitation as to the printed image size, and three-dimensional observation is also directly attained by a "cross-eye view method" in which the lines of sight are crossed. However, since the "cross-eye view method" suffers eye fatigue upon observation and unnaturalness (so-called miniascape phenomenon) upon three-dimensional observation more than the "parallel-view method", the parallel layout is more prevalently used.

In either case, a stereo image pair which has two large features: (1) system independence and (2) direct observation will remain used since its value is projected to be reevaluated as so-called media mix such as proliferation of the Internet, digital cameras, and the like progresses.

Hence, the present applicant has proposed a technique associated with an observation method and apparatus (viewer) which give different shifts to R and L images so as to allow easy high-quality observation with high natural stereoscopic feeling using an SPM (Stereo Pair in Multimedia)) as a digital stereo image pair (Japanese Patent Application No. 2000-115357). In this technique, identical images are normally displayed on two display devices (monocular mode), but when an SPM is read out from a memory card and is displayed, right- and left-eye images undergo different shift processes by a stereo image pair shift processor, and image signals that have undergone the shift processes are displayed on the display devices as right- and left-eye images (stereo mode). With the shift processes, an L image of the SPM on the left-eye image side matches an R image of the SPM on the right-eye image side as one three-dimensional image, and a high-quality three-dimensional image with high natural stereoscopic feeling can be easily observed.

On the other hand, as a digital still camera (digital camera) that can sense a stereo image, a camera described in Jpn. Pat. Appln. KOKAI Publication No. 5-30538 devised by the present inventors is known. In this camera, two imaging systems (lenses +pickup units) sense R and L images, stereo pair code data (data indicating a stereo image, L or R identification information, and the like) are individually appended to respective images, and the sensed images are recorded on a recording medium, e.g., a memory. This camera is evaluated as an excellent camera which can easily sense a stereo image.

However, the digital camera of the above reference suffers the following problems.

(a) Since two imaging systems are required, the camera indispensably becomes bulky and expensive.

(b) Since the obtained stereo image is different from the SPM (stereo pair in parallel layout), it must be additionally converted into an SPM to obtain the SPM.

If a conventional stereo adapter is combined with a general (single-lens) digital camera, it may seem that these problems (a) and (b) can be solved. However, in this case:

(c) No data that pertains to stereo as well as data indicating that the image are a stereo image is appended. Therefore, when normal two-dimensional (non-stereo) images are stored together with stereo images, their management becomes complicated. Also, it is impossible to automatically execute image shift processes upon reproduction in the viewer of the above application.

Especially, this problem (c) may be solved by appending stereo pair codes to image files that record R and L images. However, such measure cannot be taken in practice since a conventional system that combines a single-lens pickup camera with a stereo adapter cannot process R and L images as independent images.

In addition to the above problem, even when such stereo image can be recorded by some method, we have a problem resulting from the handling structure of such images as per:

(d) when an external stereo adapter is attached to the imaging system of a normal single-lens camera, phenomena of overlap of images, darkened image portion, and the like cannot be avoided due to attachment of the adapter. That is, when a small F value is selected, i.e., when the selected stop value is at the full-open side, as shown in FIG. 1A, R and L image may overlap each other. On the other hand, when a large F value is selected, i.e., the selected stop value is at the stop-down side, as shown in FIG. 1B, the portion between R and L images is darkened.

Furthermore, (e) one stereo image information is distributed to a plurality of image handling units (files). Therefore, when such images are handled by a versatile recording/reproduction apparatus or transmission apparatus, their stereo pair codes cannot be recognized, and all these images are handled as independent images. As a result, only one frame of R and L images may be inadvertently erased or transmitted.

BRIEF SUMMARY OF THE INVENTION

It is an object of the present invention to provide a method and apparatus for generating three-dimensional image data having one file structure, and a recording medium that stores the three-dimensional image data.

Since three-dimensional image data generated by the apparatus and method of the present invention, and that stored in the medium have one file structure, even when such image data is processed by versatile apparatuses including a recording/reproduction apparatus and transmission apparatus, a plurality of monocular images that form a multocular type stereo image are always processed as a single file, and inadvertent transmission or erasure of only a partial monocular image can be prevented.

According to the present invention, there is provided a data structure of a stereo image file recorded on a recording medium which is readable by a computer to be applied to an image processing apparatus, comprising:

first monocular image data;

second monocular image data having parallax with respect to the first monocular image data; and stereo data containing information regarding the data structure of the stereo image file, the stereo data including (ii) information indicating whether or not the image file is a stereo image file, and (ii) information regarding arrangement of monocular image data items included in the image file.

According to the present invention, there is provided a data structure of an M-ocular stereo image file, comprising:

an M number of monocular image data items having parallax;

stereo data containing information regarding a file structure, the stereo data including (i) information indicating whether or not the stereo image file is a stereo image file, and (ii) information indicating the M number, the M number being an integer of two or more.

According to the present invention, there is provided a data structure of a multocular stereo image file, comprising:

a plurality of monocular image data items having parallax, and attribute information data recorded in a header region, the attribute information data including information regarding arrangement of the monocular image data items.

According to the present invention, there is provided a generation method of stereo image data including a plurality of monocular image data items having parallax, comprising:

acquiring first monocular image data by performing observation from a first viewpoint;

acquiring second monocular image data by performing observation from a second viewpoint; and generating stereo data including information regarding a data structure of a stereo image, the stereo data including (i) information indicating whether or not the stereo image data is a stereo image, and (ii) information regarding arrangement of the monocular image data items included in the stereo image data.

According to the present invention, there is provided a generation method of M-ocular stereo image data, comprising:

acquiring an M number of monocular image data items having parallax; and generating stereo data containing information regarding a data structure, the stereo data including (i) information indicating whether or net the stereo image data is a stereo image, and (ii) information indicating the M number, the M number being an integer of two or more.

According to the present invention, there is provided a generation method of a multocular stereo image file, comprising:

acquiring a plurality of monocular image data items having parallax, and generating attribute information data to be recorded in a header region, the attribute information data including information regarding the number of the monocular image data items and information regarding arrangement of the monocular image data items.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be describe in detail hereinafter by way of its illustrated embodiment with reference to the accompanying drawings.

A digital camera according to an embodiment of the present invention will be described in detail below with reference to the accompanying drawings.

Figure 2:
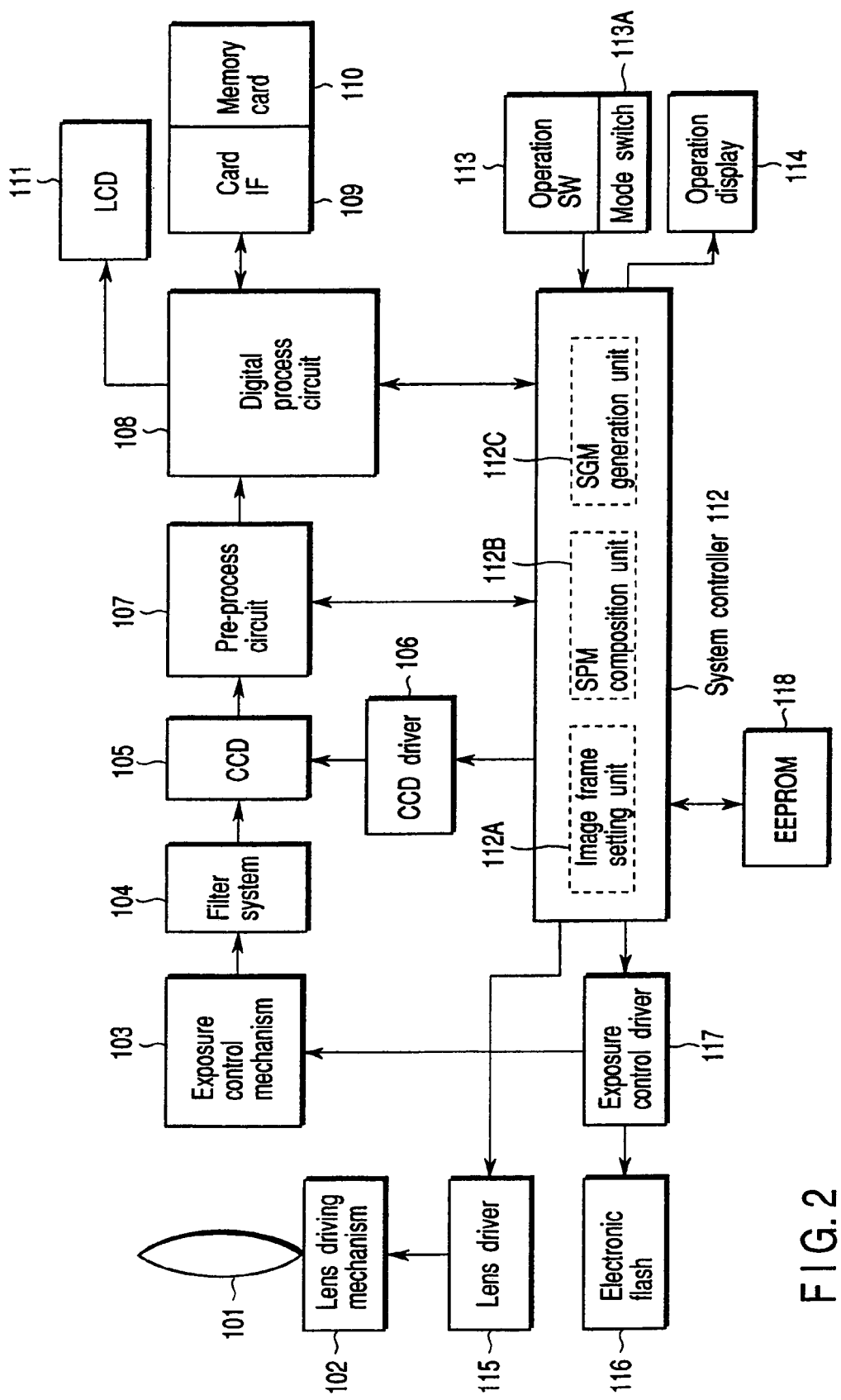
FIG. 2 is a block diagram showing the circuit arrangement of a digital camera according to an embodiment of the present invention.

FIG. 2 is a block diagram showing the circuit arrangement of a digital camera according to an embodiment of the present invention. Referring to FIG. 2, reference numeral 101 denotes an imaging lens system including various lenses to sense an image of an object; and 102, a lens driving mechanism for driving the lens system 101 in accordance with an object. The lens driving mechanism 102 drives the imaging lens system 101 to focus it on an object. Light rays reflected by the object are deflected toward a CCD 105 via the lens system 101 and a stop included in an exposure control mechanism 103. The exposure control mechanism 103 also includes a mechanical shutter, which is used as needed. In the exposure control mechanism 103, the stop is adjusted to control light rays that pass through the stop, thereby controlling an exposure amount. The light rays which have passed through the stop enter a CCD color pickup unit 105 via a low-pass & infrared cut optical filter system 104, thus forming an object image on imaging arrays of this CCD color pickup unit 105. The pickup unit 105 is driven by a CCD driver 106, and the object image on the imaging arrays is converted into an image signal. This image signal is processed by a pre-process circuit 107 which includes a gain control amplifier 107A for controlling the amplification factor, i.e., gain of the image signal, an A/D converter for converting the amplified image signal into a digital image signal, and the like. The digital image signal is processed by a digital process circuit 108 which executes various digital processes such as a color signal generation process, matrix conversion process, and the like, and is stored in a memory card 110 such as a CF or the like via a card interface 109. An LCD image display system 111 displays an image on the basis of the image signal from the digital process circuit 108.

Reference numeral 112 in FIG. 2 denotes a system controller (CPU) for systematically controlling the respective units shown in FIG. 2; 113, an operation switch system including various SWs; 114, an operation display system for displaying the operation state, mode state, and the like of the digital camera; 115, a lens driver for controlling the lens driving mechanism 102; 116, an electronic flash that emits light upon sensing an image; 117, an exposure control driver for controlling the exposure control mechanism 103 and electronic flash 116; and 118, a nonvolatile memory (EEPROM) for storing various kinds of setup information and the like.

In the digital camera according to this embodiment, the system controller 112 systematically controls the respective units. Especially, the system controller 112 controls the exposure control mechanism 103 and CCD driver 106 to drive the CCD pickup unit 105, thus controlling exposure (charge accumulation). Also, the system controller 112 controls the CCD pickup unit 105 to read an image signal therefrom, which is input to the digital process circuit 108 via the pre-process circuit 107. The image signal undergoes various signal processes, and is recorded on the memory card 110 via the card interface 109 under the control of the system controller 112. Note that the CCD pickup unit 105 may use, e.g., interline, progressive scan unit with a vertical overflow drain structure.

In the digital camera according to this embodiment, the operation switch system 113 includes a mode select switch 113A used to switch between a normal mode and a stereo mode. Furthermore, the system controller 112 functionally includes an image frame setting unit 112A for setting a trimming region of an imaging area, an SPM composition unit 112B for compositing monocular images to obtain an SPM image, and an SGM (StereoGram in Multimedia)

generation unit 112C for generating JPEG image data on the basis of the SPM image. The system controller 112 normally comprises a CPU, RAM, and ROM, and these image frame setting units 112A and 112B, and SGM generation unit 112C are implemented by a program stored in the ROM in practice.

Figure 1A:
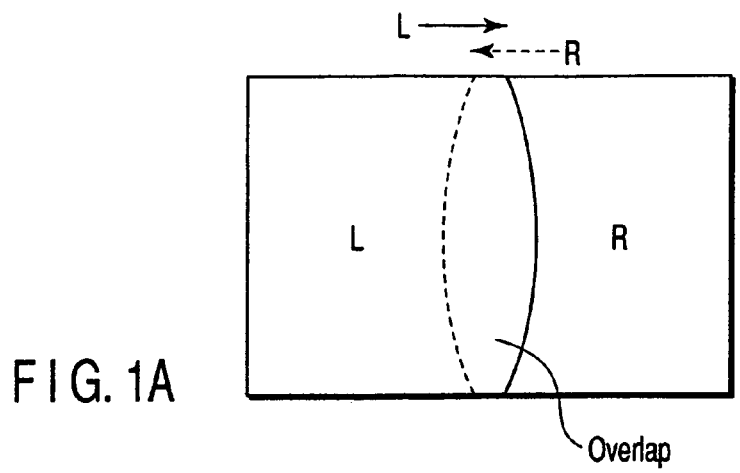
FIG. 1A is a schematic plan view showing a state wherein images overlap each other due to attachment of an adapter to an imaging camera.
Figure 1B:
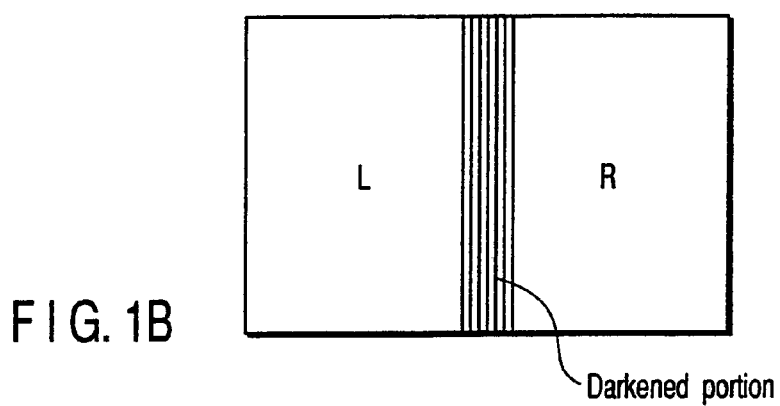
FIG. 1B is a schematic plan view showing a state wherein images are darkened due to attachment of an adapter to an imaging camera.
Figure 3:
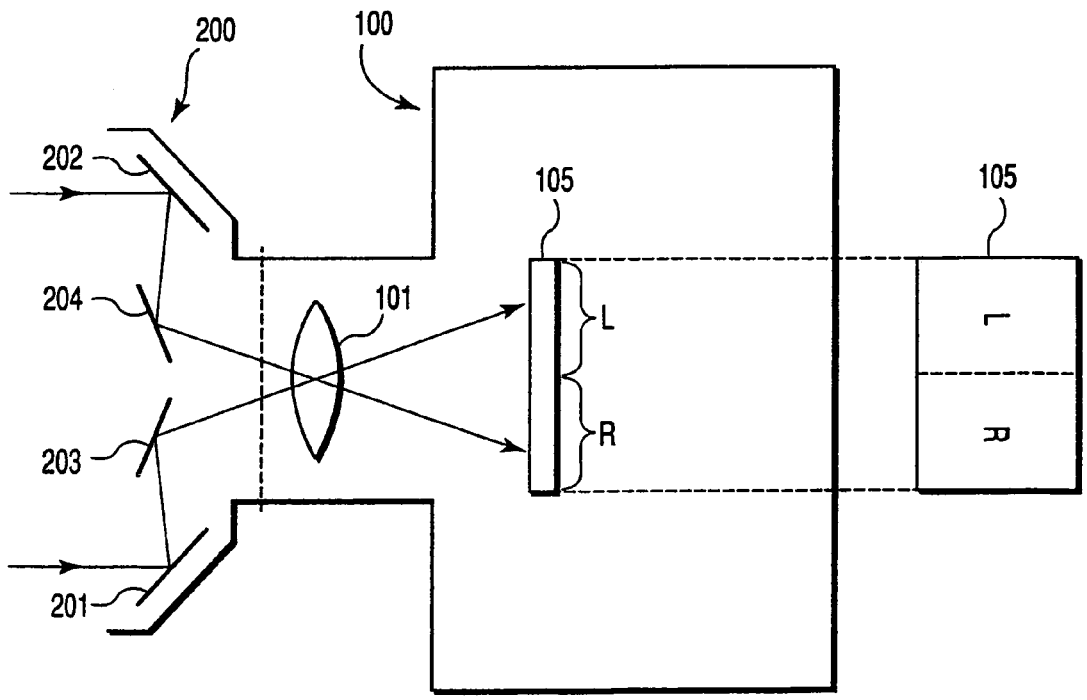
FIG. 3 is a schematic view showing the structure of a mirror type stereo adapter to be attached to the digital camera shown in FIG. 2.

To the digital camera according to the embodiment of the present invention, a mirror type stereo adapter 200 is detachably attached to the lens barrel of a camera main body 100, as shown in FIG. 3. In this adapter 200, mirrors 201 and 202 are arranged so that their optical axes are separated by a predetermined distance, i.e., parallax, and mirrors 203 and 204 for guiding light rays reflected by these mirrors 201 and 202 toward the camera side are arranged. Light rays that become incident on the right mirror 201 of the adapter form an image on a left region L of the pickup unit 105 via the mirror 203 and imaging lens 101, and light rays that become incident on the left mirror 202 form an image on a right region R of the pickup unit 105 via the mirror 204 and imaging lens 101. Note that the parallax in the above description corresponds to the distance between the optical axes of two imaging systems, and does not always match two eyes (eye distance) of a person.

In a normal imaging mode, an image is sensed in the same manner as a normal camera (single-lens camera) without attaching the adapter 200. Note that the normal and stereo modes are switched by the mode select switch 113A. Note that the mode may be automatically switched depending on whether or not the mirror type stereo adapter 200 is attached.

In the stereo mode, when the shutter is triggered while the stereo adapter 200 is attached, an image of an object is sensed in the same manner as in the normal camera. In the stereo mode, an image signal read out from all the regions of the imaging area of the CCD pickup unit 105 undergoes a trimming process.

Figure 4:
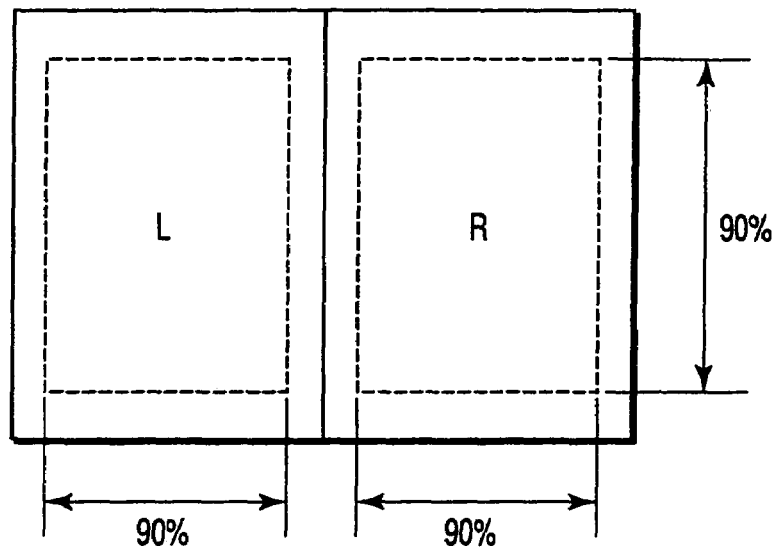
FIG. 4 is a schematic plan view showing image frames to be set in an imaging area in the digital camera shown in FIG. 2.

The image frame setting unit 112 included in the system controller 112 sets a trimming range of the imaging area of the CCD pickup unit 105, and an image read out from the imaging area of this CCD pickup unit 105 is trimmed by the digital process circuit 108. In the stereo mode, the imaging area of the pickup unit 105 is vertically divided into two regions, and an L image corresponding to the left half region and an R image corresponding to the right half region are picked up by trimming, as shown in FIG. 4. In the stereo mode, two images simply divided by trimming will be referred to as 100% trimming images hereinafter. The 100% trimming images may be output as an image signal. However, trimming with a pickup range which is narrowed down to prevent images from overlapping or being darkened due to attachment of the stereo adapter 200 to the camera is executed. In this embodiment, the width and length of the trimming range are limited to 90%. Note that only the width may be limited to 90%, but the length is also trimmed at the same ratio to adjust balance between the length and width. That is, in the stereo mode, ranges obtained by limiting the widths and lengths of the right and left regions to 90% are assigned to R and L images.

Figure 5:
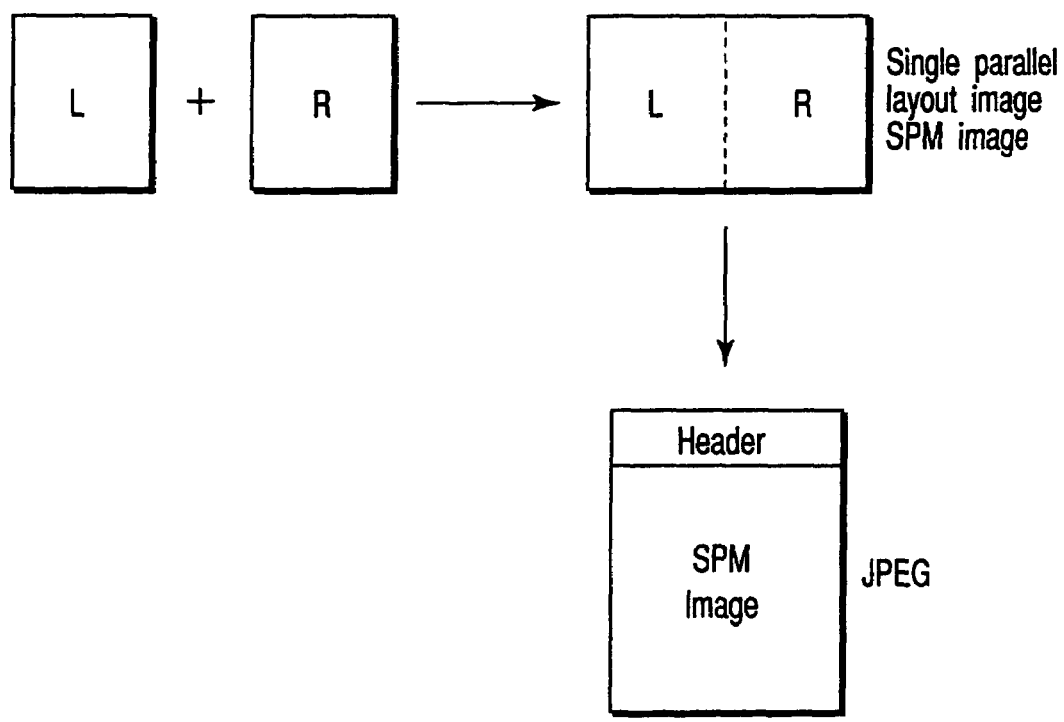
FIG. 5 is an explanatory view showing the process for generating an SPM image by compositing R and L images and then generating an SGM (StereoGram in Multimedia) in the digital camera shown in FIG. 2.

The SPM composition unit 112B included in the system controller 112 generates an SPM image from the R and L region images. That is, the R and L images obtained by trimming are composited, as shown in FIG. 5, to form a single SPM image in which two, right and left images are arranged side by side without any gap. At this time, a frame line (e.g., black defined by R=G=B=0) having a width of one to several pixels is preferably formed in a boundary region or around the SPM image to visually identify the SPM image.

The SPM image is input to the SGM (StereoGram in Multimedia) generation unit 112C included in the system controller 112 to generate JPEG image data obtained by appending a header to stereo data. Upon recording or transmission, image data is preferably compressed. Upon compression, an arbitrary method may be used, but known JPEG compression as a standard scheme is preferably used. When a JPEG stereo compressed image is generated, stereo information is recorded in predetermined tags contained in a user information field of the header shown in FIG. 5. Information to be recorded includes:

a: stereo or not (Y or N: "Y" in this example)

b: the number of region images in stereo data (an integer equal to or larger than 2: "2" in this example)

c: the layout of monocular region images (region information including the numbers of pixels in the vertical and horizontal directions) Note that the information indicating stereo or not means that a JPEG compressed image is a stereo image, and the number of images is 2 since an SPM is formed by two monocular images. Furthermore, regions right and left monocular images occupy in the SPM image are designated by two-dimensional coordinate (i.e., X-Y coordinate) addresses. For example, information indicating that an L monocular region image is a region designated by X-Y addresses (0, 0), (0, Y1), (X1, 0), and (X1, Y1), and an R monocular region image is a region designated by X-Y addresses (X1, 0), (X1, Y1), (X2, 0), and (X2, Y1) is described.

With this header information, the photographing apparatus itself or another apparatus can separate and reproduce original monocular region images by reading the information. For example, when images are picked up according to the number of images and layout information after the image is expanded, images can be observed in a layout suitable for observing a stereo image. Such SGM is an example of a structured stereo image obtained by storing all image data that form one stereo image and stereo data required in addition to the image data in one file. Since the structured stereo image is processed as one file when it is used in a versatile PC or is transmitted via the Internet, inadvertent recording, transmission, or erasure of only a partial image can be prevented.

The generated SGM is recorded in the memory card 110 via the card interface 109 by a recording circuit in the digital process circuit 108 in accordance with an instruction from the system controller 112.

Note that the card that records the SGM is used after it is being inserted into a slot or the like of, e.g., a versatile PC. The camera main body also has input/output ports, which can input/output the generated SGM via wired or wireless connection. Furthermore, the SGM can be input/output via the card (card interface).

As described above, according to this embodiment, since the stereo adapter 200 is attached to the digital camera 100 having the same arrangement as that of a normal single-lens digital camera, a plurality of monocular image frames are set on the imaging area of one pickup unit 105, and a stereo image is obtained based on a plurality of monocular images obtained from these frames, a plurality of pickup units are not required. For this reason, size and price reductions can be attained. When the image frames are appropriately set, problems such as overlap, darkened image portions, and the like unique to the adapter system can be solved.

Note that the present invention is not limited to the aforementioned embodiment. For example, the present invention may be implemented as an independent conversion apparatus which receives a plurality of independent R and L image files and generates an SGM by the same method as in the above embodiment (or executes reverse processes). In this way, conventional stereo image data which may be inadvertently erased can be directly converted into a structured stereo image free from such problem. By the reverse process, system compatibility can be assured. For example, two TIF images may be prepared and may be converted into one file structure by this conversion apparatus, as shown in FIG. 5, or vice versa.

In the above embodiment, an SPM, SGM, and the like are still images. However, the present invention is not limited to still images, and can be similarly applied to, e.g., moving images. That is, since the way the SPM is composited, and stereo data to be appended upon generating the SGM involve only elements independent from still or moving images, the conventional moving image capture technique is directly used, and MPEG as one of representative moving image compression formats is used in place of JPEG, thus practicing the present invention in the same manner as in the above embodiment to obtain the same effect.

Since the above embodiment has exemplified stereo imaging using a mirror adapter, a binocular three-dimensional image is obtained by setting two image frames on the imaging area. Also, the technique of the present invention can be applied to an arbitrary multocular three-dimensional image (i.e., trinocular or more images). For example, an n-ocular three-dimensional image (n=3 or more), which is used in a known lenticular system (a multi-projection system using a lenticular sheet print or lenticular screen or the like), may be sensed using n cameras, these n monocular images may be laid out side by side to be composited into a single image as in an SPM, and corresponding stereo data may be appended to generate an SGM in the same manner as in the above embodiment. In this case, n is recorded as the number of images of stereo data.

Furthermore, the stereo adapter is not limited to the above-mentioned mirror type adapter. For example, a prism type stereo adapter using prisms, a hybrid type adapter that combines mirrors and prisms, and the like may be used as long as they can obtain the same effect.

In either a binocular image or other multocular image, the construction of an image data portion of the SGM is not limited to a format "a single image obtained by arranging a plurality of monocular region images side by side", but may be image data formed by a plurality of pages each having a monocular image. Even in such case, since all image data corresponding to one three-dimensional image and stereo data appended thereto are combined into one file, the basic effect of the present invention can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A data structure of a stereo image file recorded on a recording medium which is readable by a computer to be applied to an image processing apparatus, comprising:
   first monocular image data;
   second monocular image data having parallax with respect to the first monocular image data; and
   stereo data containing information regarding the data structure of the stereo image file, the stereo data including (i) information indicating whether or not the image file is a stereo image file, and (ii) information regarding arrangement of monocular image data items included in the image file.

2. A data structure of a stereo image file according to claim 1, wherein the stereo data further includes information regarding the number of the monocular image data items included in the stereo image file.

3. A data structure of a stereo image file according to claim 1, wherein the information regarding the arrangement of the monocular image data items includes information regarding regions for the monocular image data items.

4. A data structure of a stereo image file according to claim 1, wherein the information regarding the arrangement of the monocular image data items includes information regarding the number of pixels in vertical and horizontal directions in the monocular image data items.

5. A data structure of a stereo image file according to claim 1, wherein the image file includes a region which visually indicating that the image file is a stereo image file.

6. A data structure of an M-ocular stereo image file recorded on a recording medium which is readable by a computer to be applied to an image processing apparatus, comprising:
   an M number of monocular image data items having parallax;
   stereo data containing information regarding a file structure, the stereo data including (i) information indicating whether or not the stereo image file is a stereo image file, and (ii) information indicating the M number, the M number being an integer of two or more.

7. A data structure of an M-ocular stereo image file according to claim 6, wherein the information indicating the M number indicates the number of monocular image data items included in the stereo image file.

8. A data structure of an M-ocular stereo image file according to claim 6, wherein information regarding arrangement of the monocular image data items includes information regarding regions for the monocular image data items.

9. A data structure of an M-ocular stereo image file according to claim 6, wherein the stereo data further includes information regarding arrangement of monocular image data items included in the stereo image file.

10. A data structure of an M-ocular stereo image file according to claim 6, wherein information regarding arrangement of the monocular image data items includes information regarding the number of pixels in vertical and horizontal directions in the monocular image data items.

11. A data structure of an M-ocular stereo image file according to claim 6, wherein the image file includes a region which visually indicates that the image file is a stereo image.

12. A data structure of a multocular stereo image file recorded on a recording medium which is readable by a computer to be applied to an image processing apparatus, comprising:
   a plurality of monocular image data items having parallax, and
   attribute information data recorded in a header region, the attribute information data including information regarding arrangement of the monocular image data items.

13. A data structure of a multocular stereo image file according to claim 12, wherein the information regarding the arrangement of the monocular image data items includes information regarding regions for the monocular image data items.

14. A data structure of a multocular stereo image file according to claim 12, wherein the information regarding the arrangement of the monocular image data items includes information regarding the number of pixels in vertical and horizontal directions in each of the monocular image data items.

15. A data structure of a multocular stereo image file according to claim 12, wherein the image file includes a region which visually indicates that the image file is a stereo image.

16. A data structure of a multocular stereo image file according to claim 12, wherein information regarding the number of the monocular image data items corresponds to the number of viewpoints associated with the parallax.

17. A generation method of stereo image data including a plurality of monocular image data items having parallax, comprising:

acquiring first monocular image data by performing observation from a first viewpoint;

acquiring second monocular image data by performing observation from a second viewpoint; and generating stereo data including information regarding a data structure of a stereo image, the stereo data including (i) information indicating whether or not the stereo image data is a stereo image, and (ii) information regarding arrangement of the monocular image data items included in the stereo image data.

18. A generation method according to claim 17, wherein the stereo data further includes information regarding the number of the monocular image data items included in the stereo image data.

19. A generation method according to claim 17, wherein information regarding arrangement of the monocular image data items includes information regarding regions for the monocular image data items.

20. A generation method according to claim 17, wherein information regarding arrangement of the monocular image data items includes information regarding the number of pixels in vertical and horizontal directions in each of the monocular image data items.

21. A generation method according to claim 17, wherein the image file includes a region which visually indicates that the image file is a stereo image.

22. A generation method of M-ocular stereo image data, comprising:

acquiring an M number of monocular image data items having parallax; and generating stereo data containing information regarding a data structure, the stereo data including (i) information indicating whether or net the stereo image data is a stereo image, and (ii) information indicating the M number, the M number being an integer of two or more.

23. A generation method according to claim 22, wherein the stereo data further includes information regarding the number of monocular image data items included in the stereo image data.

24. A generation method according to claim 22, wherein the stereo data further includes information regarding arrangement of monocular image data items included in the stereo image data.

25. A generation method according to claim 22, wherein information regarding arrangement of the monocular image data items includes information regarding regions for the monocular image data items.

26. A generation method according to claim 22, wherein information regarding arrangement of the monocular image data items includes information regarding the number of pixels in vertical and horizontal directions in each of the monocular image data items.

27. A generation method according to claim 22, wherein the image data includes a region which visually indicates that the image data is a stereo image.

28. A generation method of a multocular stereo image file, comprising:

acquiring a plurality of monocular image data items having parallax, and generating attribute information data to be recorded in a header region, the attribute information data including information regarding the number of the monocular image data items and information regarding arrangement of the monocular image data items.

29. A generation method according to claim 28, wherein the information regarding the arrangement of the monocular image data items includes information regarding regions for the monocular image data items.

30. A generation method according to claim 28, wherein the information regarding the arrangement of the monocular image data items includes information regarding the number of pixels in vertical and horizontal directions in each of the monocular image data items.

31. A generation method according to claim 28, wherein the image file includes a region which visually indicates that the image file is a stereo image file.

32. A generation method according to claim 28, wherein the information regarding the number of the monocular image data items corresponds to the number of viewpoints associated with the parallax.

* * * * *